Patented Oct. 11, 1927.

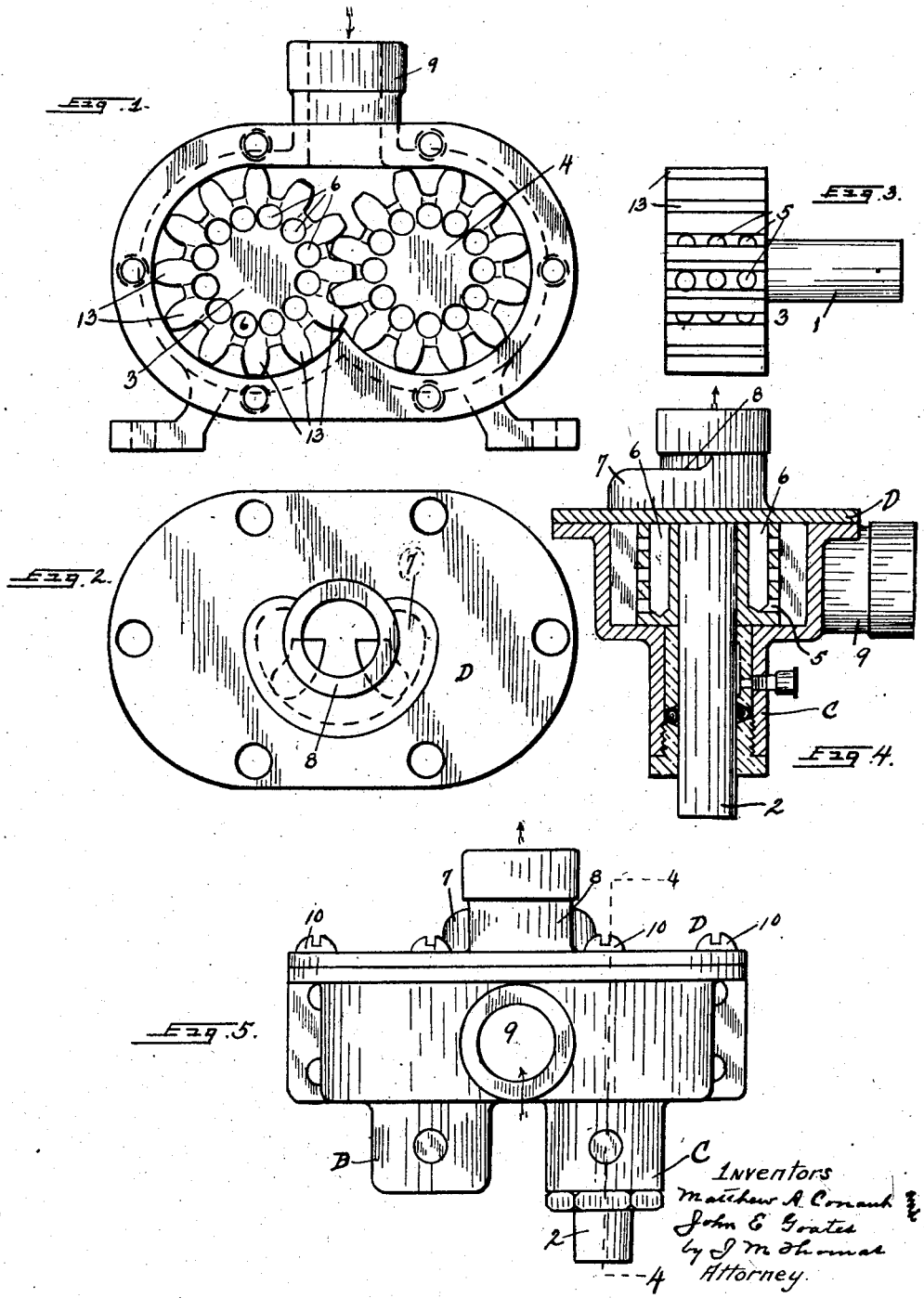

1,644,817

UNITED STATES PATENT OFFICE.

MATTHEW A. CONANT AND JOHN E. GOATES, OF PROVO, UTAH.

GEAR-DRIVE PUMP.

Application filed April 12, 1926. Serial No. 101,353.

Our invention relates to pumps, and has for its object to provide a new and efficient gear pump wherein the involute form of teeth forces the entrapped liquid through radially disposed conduits into their respective ports of egress, which all open into one discharge.

A further object is to provide a force pump of the gear type wherein sediment and heavier particles in the liquid will pass the gears and into conduits where such sediment can not injure the contact faces of the teeth.

These objects we accomplish with the device illustrated in the accompanying drawings in which similar numerals and letters of reference indicate like parts throughout the several views and as described in the specification forming a part of this application and pointed out in the appended claim.

In the drawings, of which we have shown the best and most substantial embodiment of our invention, Figure 1 is a side elevation of our pump with the side plate removed. Figure 2 is a side elevation of the cover plate. Figure 3 is a side elevation of one of the gears. Figure 4 is a section on line 4—4 of Figure 5; and Figure 5 is a plan view of the pump showing the inlet and exhaust pipes.

In the drawings we have shown the casing in which the gears are mounted as A. The said casing is supported by suitable brackets and has bearing bosses B and C on the side in which the shafts 1 and 2 are carried and supported. On each of the shafts 1 and 2 we provide intermeshing gears 3 and 4, and as they are both alike, we will describe but one. The said gear wheel 3 has a plurality of teeth or cogs 13 cut in its periphery, and has a plurality of radial ports 5 bored between each of said cogs 13 and opening into conduits 6 which are bored parallel to the axis of each gear, and all of said conduits 6 open into a discharge chamber 7. The said chamber 7 opens to the interior of the discharge pipe 8. An inlet opening is provided in the upper wall of the casing A, through which liquid is drawn into the gears of the pump. A cover plate D is provided, which is secured to the said casing A by the tap screws 10. Centrally in said cover plate we provide an outlet hole through which the liquid is forced from the gears. The pipe 8 which surrounds the discharge hole opens into the enlarged chamber 7 in order that the conduits 6 in the gears will be in alinement with the said outlet hole 8. The said inlet and outlet holes are both provided with pipe connections so that the pump may be used at any desired place with the flow of liquid controlled. Conventional packing means are provided for sealing the said casing; also for lubricating the bearings.

The operation of our invention is as follows:—

With the gear wheels 3 and 4 meshing within the casing A and the shafts 1 and 2 journalled in the bosses B and C, the cover plate 2 is secured to the casing A by the tap screws 10 and any source of power may be applied to rotate the shaft 2. The gear wheels will be rotated and the liquid will be drawn into the space between the gears 3 and 4. As the gear wheels 3 and 4 rotate the liquid between the teeth of the gear wheels will be caught by said teeth and the gears turning toward each other will force the liquid through the holes 5 into the conduit 6 and the liquid will be forced through the outlet opening or hole 8. As the wheels rotate the liquid will continue to be forced out through the outlet hole 8.

Having thus described our invention, we desire to secure by Letters Patent and claim:—

In a pump of the class described the combination of a casing composed of two parts, one part being provided with bearing portions for said pump; an inlet opening on the top side of said casing; an outlet opening on one side of said casing taking the entire flow from the pump; means to support said pump; intermeshing gears carried in said casing each gear having spaced apart conduits bored parallel with its axis; stub shafts on one side of said gears, by which they are supported in said casing, carried in said bearing portions; and a plurality of openings between the teeth of said gears, each opening being in open connection with one of the conduits running parallel with the axis of the gear, through which fluids may be forced when the gears are rotating.

In testimony whereof we have affixed our signatures.

MATTHEW A. CONANT.
JOHN E. GOATES.